(12) United States Patent
Lindström

(10) Patent No.: US 10,126,731 B2
(45) Date of Patent: Nov. 13, 2018

(54) HEIGHT-ADJUSTABLE TABLE USING EYE DETECTION

(71) Applicant: KIH-utveckling AB, Jönköping (SE)

(72) Inventor: Robert Lindström, Bankeryd (SE)

(73) Assignee: KIH-utveckling AB, Jönköping (SE)

( * ) Notice: Subject to any disclaimer, the term of this patent is extended or adjusted under 35 U.S.C. 154(b) by 336 days.

(21) Appl. No.: 14/964,915

(22) Filed: Dec. 10, 2015

(65) Prior Publication Data

US 2016/0170402 A1 Jun. 16, 2016

(30) Foreign Application Priority Data

Dec. 12, 2014 (EP) ..................................... 14197523

(51) Int. Cl.
| | |
|---|---|
| *A47B 21/02* | (2006.01) |
| *A47B 21/04* | (2006.01) |
| *A47B 27/02* | (2006.01) |
| *A47B 9/20* | (2006.01) |
| *G05B 19/402* | (2006.01) |

(Continued)

(52) U.S. Cl.
CPC .............. *G05B 19/402* (2013.01); *A47B 9/00* (2013.01); *A47B 9/20* (2013.01); *A47B 21/02* (2013.01); *A47B 21/04* (2013.01); *A47B 27/02* (2013.01); *A47B 9/04* (2013.01); *A47B 2200/0052* (2013.01); *A47B 2200/0056* (2013.01); *A47B 2200/0062* (2013.01); *G05B 2219/36514* (2013.01)

(58) Field of Classification Search
CPC .......................... A47B 2200/0062; A47B 9/00; G05B 19/402; G05B 2219/36514
See application file for complete search history.

(56) References Cited

U.S. PATENT DOCUMENTS

| | | | |
|---|---|---|---|
| 5,323,695 A | 6/1994 | Borgman et al. | |
| 7,439,956 B1 | 10/2008 | Albouyeh et al. | |

(Continued)

FOREIGN PATENT DOCUMENTS

CN 104055344 9/2014

OTHER PUBLICATIONS

Extended European Search Report, EP Application No. 14197523.5, dated Jun. 23, 2015 (6 pages).

*Primary Examiner* — Raj R Gupta
(74) *Attorney, Agent, or Firm* — Kagan Binder, PLLC

(57) ABSTRACT

The present invention relates to a height-adjustable table (1) height-adjusting arrangement (100) for adjusting the height of the table (1), wherein the height-adjusting arrangement (100) comprises at least one leg, each leg having an inner tubular member (112) and an outer tubular member (113) arranged for telescopic movement relative to each other, and a linear actuator (114) coupled to said tubular members (112, 113) and which is configured to provide the telescopic movement between the tubular members (112, 113), and an electric motor connected to the linear actuator (114) and configured to operate the linear actuator for providing telescopic movement between the tubular members. The height-adjusting arrangement (100) further comprises an eye detection unit arranged to detect the position of a user's eyes. The height-adjusting arrangement (100) is configured for control of the height of the height-adjustable table (1) based on the detected position of a user's eyes.

16 Claims, 4 Drawing Sheets

(51) Int. Cl.
*A47B 9/00* (2006.01)
*A47B 9/04* (2006.01)

(56) References Cited

U.S. PATENT DOCUMENTS

| | | | |
|---|---|---|---|
| 2009/0150006 A1* | 6/2009 | Albouyeh | G06F 1/1601 700/302 |
| 2013/0199419 A1* | 8/2013 | Hjelm | A47B 9/00 108/20 |
| 2014/0137773 A1 | 5/2014 | Mandel et al. | |

\* cited by examiner

HEIGHT-ADJUSTABLE TABLE USING EYE DETECTION

This application claims benefit from European Application No. 14197523.5, which was filed on Dec. 12, 2014, the entirety of said patent application is incorporated herein by reference.

TECHNICAL FIELD

The present invention relates to a table, in particular a height-adjustable table for use in a work place.

BACKGROUND

In the field of height-adjustable tables, it is common that a user changes the working position on a regular basis. It is known to be recommended that people working at tables should vary their position in order to avoid pains and strains on the body. Also, it is becoming more and more common that for instance in an open office, the workplaces are portable, such that a person do not have a personal office space, but any person can sit at any desk as long as he/she is provided with the right tools. This scenario puts more responsibility on the work place to suit a portable work environment. The desks and chairs must, for instance be easily adjusted to suit the person sitting and standing at the desk. A solution to this may be a height-adjustable table, wherein the user may adjust the height of the table by pressing a button on the table or on a remote control. However, since office work is fairly static, it is of high importance that a good ergonomic posture is kept by the user. It is therefore a need for a solution that may improve the use of a height-adjustable table and ensure that a user works ergonomically.

SUMMARY

It is an object of the present invention to provide an improved solution that alleviates the mentioned drawbacks with present devices. Furthermore it is an object to provide a height-adjustable table that will improve the ergonomics at a work place.

The invention is defined by the appended independent claim. Embodiments are set forth in the dependent claims, in the following description and in the drawings.

The invention is based on the inventor's realization that by providing a height-adjustable table stand that automatically adjusts the height based on the user's position, a more ergonomic posture may be kept by the user.

An aspect of the present invention is to provide a height-adjustable table comprising a height-adjusting arrangement for adjusting the height of the table. The height-adjusting arrangement comprises at least one leg, each leg has an inner tubular member and an outer tubular member arranged for telescopic movement relative to each other. Further a linear actuator is coupled to the tubular members and is configured to provide the telescopic movement between the tubular members. An electric motor is connected to the linear actuator and configured to operate the linear actuator for providing telescopic movement between the tubular members, wherein the height-adjusting arrangement further comprises an eye detection unit arranged to detect the position of a user's eyes, wherein the eye detection unit is connected to the height-adjusting arrangement for control of the height of the height-adjustable table based on the position of a user's eyes.

By having a height-adjustable table having a height-adjusting arrangement that comprises an eye detection unit, the eye detection unit may detect the position of the user's eyes and use the data to control the height of the table. The control of the height of the table may be based on the detection of the position of a user's eyes. The electric motor may be controlled based on said detection to extend or retract the linear actuator to achieve a desired height of the at least one leg. This feature may facilitate an accurate ergonomic posture for the user at for instance a work place. Since office work may involve static body postures, it may be of high importance that the body posture is kept as healthy and ergonomic as possible. Also, by having this feature, it may be easy to change work place without the extra hassle of setting up the work place. This may be advantageous, since it is becoming more and more common with portable offices, where the user may use any work place available in an office since stationary equipment is not being needed. In addition, often a user's knowledge about ergonomic work places may be inadequate. By having an automatic or semi-automatic adjustable function, it allows any person using the work places to obtain accurate and suitable working posture. The eye detection unit may be placed in connection to a reference point on the table, for instance on a work top of the table. The eye detection unit may alternatively be placed stationary on a wall. The required height of the table may be calculated based on the eyes' position. The required height may be calculated in combination with the position of the eyes and on recommended ergonomic postures which may have been studied and compiled for a number of people. For instance a person may require a certain height of the table, not only because of its tallness, but also because of the person's expected distance between head and elbow, which may vary from person to person. For example, a shorter person may also have a shorter upper body, and because of that, the work table need to be closer to the head than for a tall person. This type of data may be calculated by a formula, or alternatively taken from a table with data compiled from statistical values of persons' heights and sizes.

According to an embodiment of the invention, the eye detection unit may be configured to detect the position of a user's eyes to obtain positioning data. The positioning data may be used for determining height data. The height-adjusting arrangement may further comprise a control device configured to use the height data to control the height-adjusting arrangement.

The eye detection unit may detect the user's eyes, and subsequently determine the position of the eyes. The position of the eyes may be the base for the positioning data. This positioning data may comprise data obtained from the eye detection unit, such as a distance to the user's eyes and/or an angle of the eye's position. Alternatively, the eye detection unit may determine the position of the eyes in another suitable way. This positioning data may in turn be suitably processed to obtain height data for the control device to control the height adjustment of the table. This may involve calculating the positioning data according to a formula or an algorithm in order to obtain the height data. The height adjustment may be done in any way suitable, and the positioning data of the eyes may be used suitably in order to achieve a height adjustment, depending on available techniques. The height data may be used by the control device to control the electric motor to adjust the linear actuator to a desired length, corresponding to a desired height of the table. Further, any adjustment may be overridden by the user in order to make fine tuning of the adjustment possible. For fine tuning of the adjustment, the height-adjusting arrangement may comprise an up/down control panel for manual adjustment of the table height.

According to an embodiment of the invention, the positioning data may be determined based on a distance from a user's eyes to a reference point, and an angle relative to a reference plane.

The eye detection unit may need references to measure the position of the eyes relative to. The eye detecting unit may be configured for measurement between the eyes and a predetermined reference point. This reference point may be located in connection to the eye detection unit, or a point on a wall for instance. Also, the angle may be measured relative to a reference plane or a reference axis. This reference plane may be parallel to a work top or a wall. The reference plane or axis may not necessarily be a physical plane or area, but may be an internally set reference inside the eye detection unit.

According to an embodiment of the invention, the height-adjusting arrangement may further comprise a processing unit configured to process the positioning data to obtain height data.

The positioning data which may serve a basis for the height data may be calculated using a formula or similar. This calculation may be processed in a processing unit, a processor, or similar. The processor may alternatively be wirelessly connected to the height-adjusting arrangement, the eye detection unit or the control device. The processor may be located anywhere.

According to an embodiment of the invention, the eye detection unit may be configured to process said positioning data to obtain said height data.

The processor may be located in the eye detection unit, or the eye detection unit itself may comprise resources to preform the data processing. The eye detection unit may thus obtain positioning data, and process the positioning data to obtain height data, which in turn may be transmitted to the control device for controlling the height of the table. By having the eye detector being configured to process the positioning data to obtain height data, it may be possible to make the arrangement small in size, without additional cabeling, as well as the arrangement may facilitate retrofitting of the eye detection unit on an existing table.

According to an embodiment of the invention, the control device may be configured to process said positioning data to obtain said height data.

The processor may be located in the control device, or the control device itself may comprise resources to preform the data processing. The control device may thereby receive the positioning data from the eye detection unit, and process the positioning data to obtain the height data. The control device may use the obtained height data to control the height adjustment of the table, i.e. control the operation of the electric motor extending or retracting the linear actuator.

According to an embodiment of the invention, the eye detection unit may be arranged on the height-adjustable table.

The eye detection unit may be mounted on the work top of the height-adjustable table. It may be located at an end on the opposite side from where the user may be standing in order to achieve a suitable unbroken view of the user's eyes. For an eye detection unit being placed on the table, it means that it moves with the table as the table is being adjusted. This may be an advantage since the eye detection unit itself may comprise a reference to which the position of the eyes may relate to, and hence more easily adjust if the eyes are out of range. It may alternatively be mounted on a computer monitor or similar. Alternatively, it may be mounted at any other suitable place provided that the eye detection unit has an unobstructed view of a user's eyes.

According to an embodiment of the invention, the eye detection unit may be fixedly arranged independent of the height of the table.

The eye detection unit may be stationary mounted on for instance a wall, provided that the eye detection unit has an unobstructed view of a user's eyes.

According to an embodiment of the invention, the height-adjustable table may further comprise an adjustable auxiliary equipment stand, wherein the eye detection unit may be connected to the adjustable auxiliary equipment for control of the height of the adjustable auxiliary equipment based on the position of a user's eyes.

On many occasions, office work involve auxiliary equipment. Such may be a computer monitor or a drawing board or some other type of equipment that may need personal adjustment. By making the auxiliary equipment stand automatically or semi-automatically adjustable, the positioning data obtained by the eye detection unit may be used to control the height and/or working angle of the equipment stand. However, any adjustment may be overridden by the user in order to make fine tuning of the adjustment possible.

According to an embodiment of the invention, the adjustable auxiliary equipment stand may be height adjustable relative to the table.

The adjustment may be automatically controlled by a control device that may control the movement. The height of the equipment stand may be calculated relative to the table such that the height of the table may depend on the height adjustment of the auxiliary equipment stand. The height of the auxiliary equipment stand may be calculated in combination with the known table height in order to set a suitable height.

According to an embodiment of the invention, the adjustable auxiliary equipment stand further may be configured to be adjusted at an angle based on the position of a user's eyes.

The equipment stand may be rotationally adjustable in order to achieve a suitable working angle of the equipment stand. The rotation may be a tilt upwards and downwards. The adjustment may be automatic or semiautomatic by a control device, based on the position of the eyes which is detected by the eye detection unit. The rotational adjustment may also be done in relation to a known angle, for instance the angle of the eye position relative to a reference plane which may be a horizontal plane.

According to an embodiment of the invention, the adjustable auxiliary equipment stand may be a computer monitor stand or a drawing board or the like.

By connecting the computer monitor stand or a drawing board to an eye detection unit, it may facilitate the setting of a work place in an ergonomic manner.

According to an embodiment of the invention, the adjustable auxiliary equipment stand may be configured to be adjusted further based on the height of the height-adjustable table.

Since an adjustment of an auxiliary equipment stand may be different depending on the person using the equipment, it may be adjustable depending on a various number of variables depending on how the user is built. A tall user may require a high table and a slightly higher equipment stand relative to the table, since their upper bodies may be longer. The adjustment of the equipment stand may thus be calculated based on the eye position in combination with the height of the table in order to achieve a correct adjustment of the equipment stand. The equipment stand may thus be adjusted to a specific user's required height, with regard to the height to the table in order to achieve a user specific equipment height. Further, any adjustment may be overridden by the user in order to make fine tuning of the adjustment possible. A manual tuning of the table height by a user may in one embodiment provide an automatic height and/or rotation adjustment of the equipment stand. The equipment stand may thereby be automatically adjusted to an ergonomic position for the user based on the position of the eyes and the height of the table.

According to an embodiment of the invention, the height-adjusting arrangement further may comprise an activator configured to receive and respond to a demand for height adjustment to initiate.

The height-adjustable table may be configured such that a user requests the table to adjust on demand. More specifically, when a user changes position from sitting to standing, he/she may push a button for the eye detection unit to activate, and the adjustment to take place. This may be an advantage since an on-demand-request may ensure that the table does not move at inconvenient times, for instance when a person only rises from the chair for a brief moment. The activator may upon activation initiate the eye detection. When the activator is activated, the eye detection unit is configured to detect the position of the eyes to provide the positioning data. The eye detection unit or the control device may then be configured to obtain the height data based on the positioning data, and the control device may control the electric motor to provide a height adjustment of the linear actuator to a desired height based on the height data. Alternatively, the detection and processing may already be done, and the activator only upon activation is configured to activate the height adjustment, which may have been determined at an earlier stage. There may be a time difference depending on the solution used. The activator may alternatively be a foot pedal or an other type of switch.

The activator may be a button, a key switch, a touch screen, a lever or similar. The activator may alternatively be voice controlled. Alternatively, the height adjustment may occur automatically and instantly. More specifically, the eye detection unit may detect a change in a user's eye position, and automatically adjust the height accordingly. An automatic height adjustment feature may comprise a tolerance module, as to avoid any unwanted movements from the table. Such tolerance module may be set such that a certain amount of movement from a user may be allowed before any adjustment takes place. Also, a time delay module may be involved, so that movement within a predetermined time span does not affect the height adjustment.

According to an embodiment of the invention, the eye detection unit is configured to provide a command signal to the control device for raising or lowering the height-adjustable table based on the detected position of a user's eyes.

The height adjustment may occur automatically and instantly. More specifically, the eye detection unit may detect a change in a user's eye position, and provide the control device with a command signal to raise or lower the table. The control device may then control the height arrangement to adjust until the eye detection unit stops sending the command signal, when the eye position corresponds to the correct height. The eye detection unit may thus continuously update the eye position at the time of adjustment. This may be an alternative to having a processing unit. This may be an advantage since a start-stop-command feature may be possible to install in addition to, or instead of, an up/down control panel, as a retrofit option on existing height-adjustable tables. To clarify, the eye detection unit may provide the control device with the same type of signal that may be provided by the activator for start and stop.

BRIEF DESCRIPTION OF DRAWINGS

The invention will in the following be described in more detail with reference to the enclosed drawings, wherein.

DETAILED DESCRIPTION OF EMBODIMENTS

Figure 1:
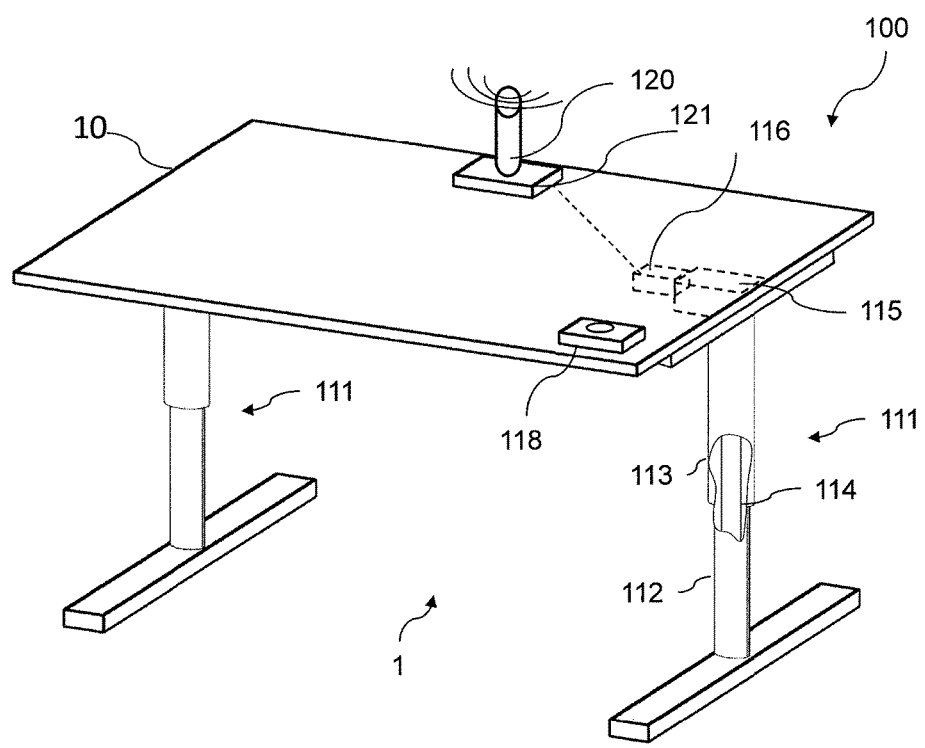
FIG. 1 is a perspective view of a height-adjustable table according to an embodiment of the invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

In FIG. 1, a height-adjustable table 1 is shown. The height-adjustable table 1 comprises a work top 10, and a height-adjusting arrangement 100 comprising two telescopic legs 111, an electric motor 115 and an eye detection unit 120. Each telescopic leg 111 has a linear actuator 114 in order to provide the telescopic movement of the telescopic leg 111. In FIG. 1, an eye detection unit 120 is mounted on the work top 10. The eye detection unit 120 may be stationary mounted on the work top 120, preferably at a point there is no risk for the eye detection unit 120 to be covered by any other equipment on the work top 10. The eye detection unit 120 may use available techniques, such as optical measuring, to detect the eye and measure its position. The height-adjusting arrangement may comprise a processing unit 121 in order to process any data to be obtained. In FIG. 1, the processing unit 121 is integrated in the eye detection unit. The processing unit 121 may alternatively be incorporated in for instance the control device 116 or alternatively be arranged anywhere else between the eye detection unit 120 and the control device 116.

In FIG. 1, an activator 118 is available. The activator 118 may be a button, which when being pressed, sends a request to initiate the height adjustment. The eye detection unit 120 may measure the eye's position on demand, and next provide the positioning data to the processor 121 which may calculate a height data. The height data may be interpreted by the control device 116 which may send a demand to the electric motor 115. The height data may be calculated by using tabled data or a formula or an algorithm. This data may be based on statistical information about heights on a range of people, so that a correct value on a height for a work top 10 can be obtained for a well suited ergonomic posture. The activator 118 may alternatively be voice controlled, or incorporated in a computer application or mobile application. Other physical activators may be a lever, button, touchscreen or anything suitable.

Figure 2:
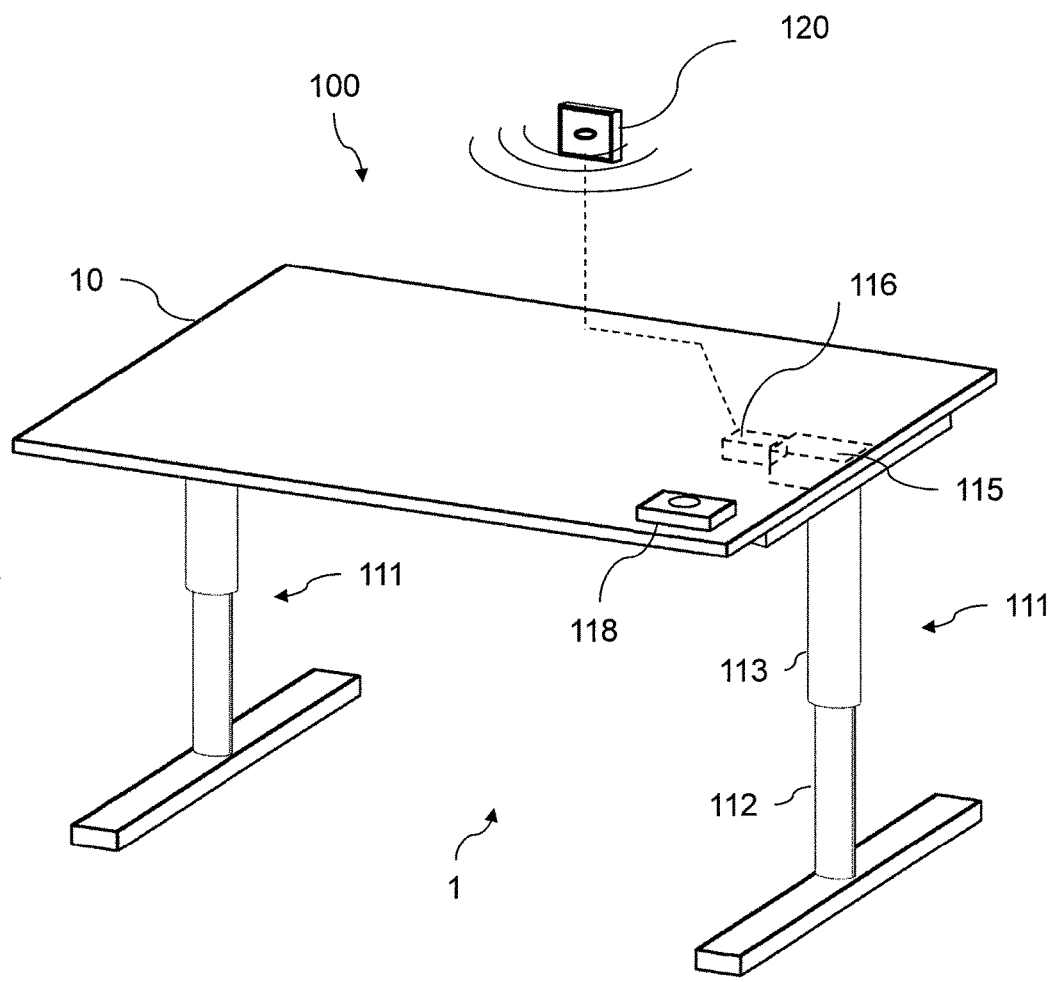
FIG. 2 is a perspective view of a height-adjustable table according to an embodiment of the invention.

FIG. 2 shows a perspective view of a height-adjustable table 1 according to an embodiment. In FIG. 2, the eye detection unit 120 is stationary mounted on a wall close to the table 1, in front of the position where a user may work. This mounting may be arranged so that a suitable measurement of the eye position may be possible. It may be possible to mount an eye detection unit 120 at some other suitable place, such as a portable stand in connection to the table 1, or a wall on a side.

Figure 3:
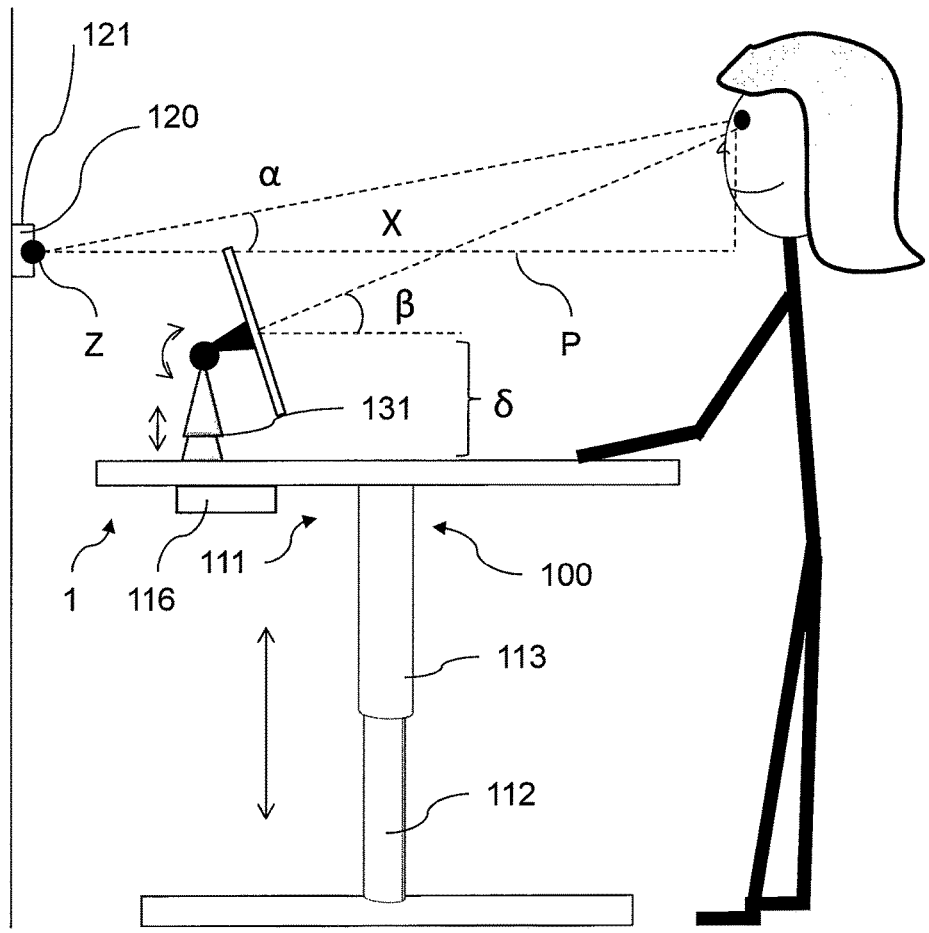
FIG. 3 is a side view of a height-adjustable table according to an embodiment of the invention.

FIG. 3 shows a schematic side view of a height-adjustable table 1 and a user. The eye detection unit 120 is mounted on a wall in front of the user. It is shown schematically the distance X between the eye detection unit 120 and the eye, and the angle of the eyes position in relation to a reference plane P, or a reference line. In FIG. 3 this reference plane P or reference line is horizontally flat. The eye detection unit 120 comprises resources to measure for instance a distance and an angle in order to obtain positioning data of the position of the eyes. This data is processed or calculated in the processing unit 121 and interpreted by the control device 116 in order to control the height-adjusting arrangement 100 to obtain the correct height. In FIG. 3, the processing unit 121 is incorporated in the eye detection unit 120. The eye detection unit 120 may alternatively be wirelessly connected to the control device, since a cable connection may be restraining.

Further in FIG. 3, an adjustable auxiliary equipment stand 130, in this example a computer monitor stand 131, is shown. This adjustable auxiliary equipment stand 130 (further called "equipment stand") may be automatically adjustable using the positioning data obtained from the eye detection unit 120. The equipment stand 130 may thus be arranged to, in combination with the height-adjustable table 1, automatically provide a suitable adjustment in height. The height adjustment may be calculated based on the height difference δ between the table and the desired height of the equipment stand. The equipment stand in FIG. 3 is also rotatably adjustable so that it may provide an angle β of the user equipment 130, for instance a computer screen, so that an accurate ergonomic posture of the head and neck is kept while viewing a computer. In addition, any adjustment of the equipment stand may be taken in combination with the height of the table in order to achieve a suitable height and angle of the equipment stand. The equipment stand may use the same positioning data provided by the eye detection unit 120, such that a fine adjustment of the equipment stand 130 is possible. However, it may be possible to provide adjustment of the equipment stand 130 in any other suitable way based on the positioning data provided from the eye detection unit 120.

Figure 4:
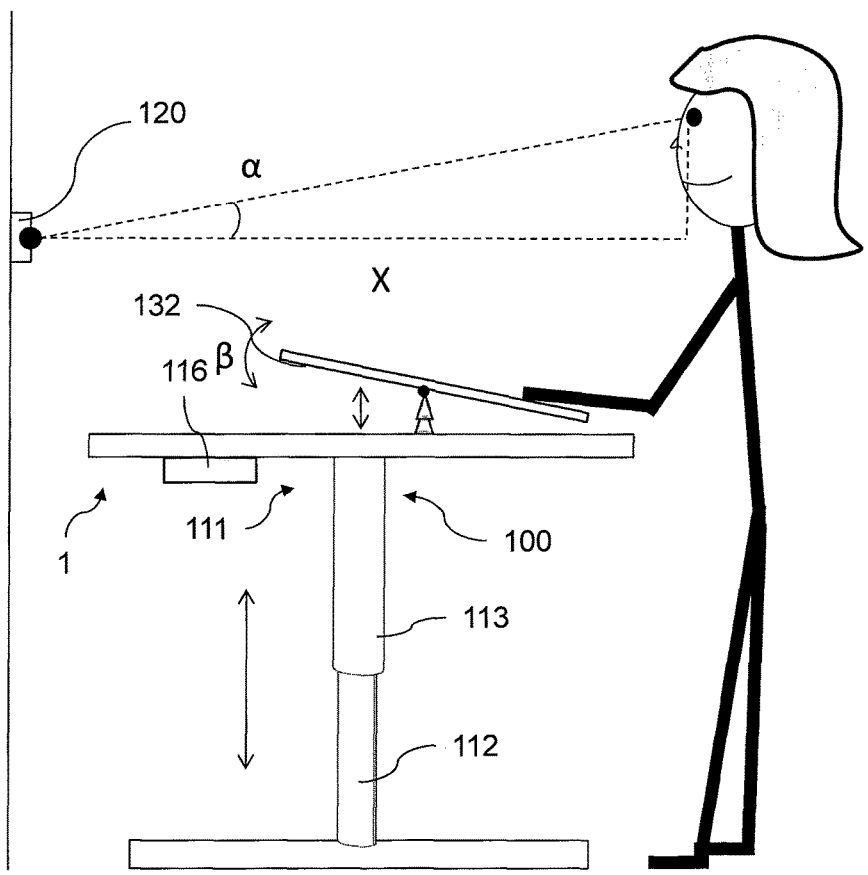
FIG. 4 is a perspective view of a height-adjustable table according to an embodiment of the invention.

In FIG. 4, an alternate equipment stand 130 is shown in the form of a drawing board 132. In many work environments, such as work places involving design, architecture or reading, where the eye generally is focused on the table 1, rather than on a computer screen, the equipment stand 10 in the form of a drawing board 132 or a secondary work top may need to be placed at an angle β relative to the table 1. The adjustment function of the drawing board 132 is substantially the same as described above for the equipment stand 130.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A height-adjustable table comprising,
   a height-adjusting arrangement for adjusting a height of the table, wherein the height-adjusting arrangement comprises:
      at least one leg, each leg having an inner tubular member and an outer tubular member arranged for telescopic movement relative to each other,
      a linear actuator coupled to said tubular members and which is configured to provide the telescopic movement between the tubular members, and
      an electric motor connected to the linear actuator and configured to operate the linear actuator for providing telescopic movement between the tubular members,
   wherein the height-adjusting arrangement further comprises an eye detection unit arranged to detect a position of a user's eyes, wherein the height-adjusting arrangement is configured for control of the height of the height-adjustable table based on the detected position of the user's eyes,
   wherein the height-adjustable table further comprises an adjustable auxiliary equipment stand, wherein the eye detection unit is operatively connected to the adjustable auxiliary equipment stand for control of the height of the adjustable auxiliary equipment stand based on the detected position of the user's eyes, and
   wherein the adjustable auxiliary equipment stand is configured to be adjusted further based on the height of the height-adjustable table.

2. Height-adjustable table according to claim 1, wherein the eye detection unit is configured to detect the position of the user's eyes to obtain positioning data, which positioning data is used for determining height data, wherein the height-adjusting arrangement further comprises a control device configured to use said height data to control the height-adjusting arrangement.

3. Height-adjustable table according to claim 2, wherein the positioning data is determined based on a distance from the user's eyes to a reference point, and an angle relative to a reference plane.

4. Height-adjustable table according to claim 3, wherein the eye detection unit is configured to process said positioning data to obtain said height data.

5. Height-adjustable table according to claim 3, wherein the control device is configured to process said positioning data to obtain said height data.

6. Height-adjustable table according to claim 5, wherein the eye detection unit is stationary mounted, regardless of the height of the table.

7. Height-adjustable table according to claim 1, wherein the eye detection unit is arranged on the height-adjustable table.

8. Height-adjustable table according to claim 1, wherein the adjustable auxiliary equipment stand is height adjustable relative to the table.

9. Height-adjustable table according to claim 1, wherein the adjustable auxiliary equipment stand further is configured to be adjusted at an angle based on the detected position of the user's eyes.

10. Height-adjustable table according to claim 1, wherein the adjustable auxiliary equipment stand is a computer monitor stand.

11. Height-adjustable table according to claim 1, wherein the height-adjusting arrangement further comprises an activator configured to receive and respond to a demand from the user to initiate the height adjustment.

12. Height-adjustable table according to claim 1, wherein the adjustable auxiliary equipment stand is a drawing board.

13. Height-adjustable table according to claim 1, further comprising auxiliary equipment.

14. Height-adjustable table according to claim 13, wherein the auxiliary equipment comprises a computer monitor.

15. Height-adjustable table according to claim 13, wherein the auxiliary equipment comprises a drawing board.

16. Height-adjustable table according to claim 13, wherein the auxiliary equipment is operatively connected to the eye detection unit.

* * * * *